United States Patent
Clauser et al.

(10) Patent No.: US 9,527,464 B2
(45) Date of Patent: Dec. 27, 2016

(54) BUMPERS INCLUDING A REINFORCEMENT BRACKET AND VEHICLES INCORPORATING THE SAME

(71) Applicant: Toyota Motor Engineering & Manufacturing North America, Inc., Erlanger, KY (US)

(72) Inventors: Mark D. Clauser, Saline, MI (US); Yizhou Fan, Ann Arbor, MI (US); Palani Palaniappan, Ann Arbor, MI (US); Naipaul Ramoutar, Ann Arbor, MI (US); Manikandan Baby Mony, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/602,803

(22) Filed: Jan. 22, 2015

(65) Prior Publication Data
US 2016/0144813 A1 May 26, 2016

Related U.S. Application Data

(60) Provisional application No. 62/084,241, filed on Nov. 25, 2014.

(51) Int. Cl.
*B60R 19/34* (2006.01)
*B60R 19/24* (2006.01)
(Continued)

(52) U.S. Cl.
CPC .............. *B60R 19/24* (2013.01); *B60R 19/023* (2013.01); *B60R 19/03* (2013.01); *B60R 19/18* (2013.01);
(Continued)

(58) Field of Classification Search
CPC ........ B60R 19/34; B60R 19/18; B60R 19/023; B60R 19/03; B60R 2019/247; B60R 19/24
(Continued)

(56) References Cited

U.S. PATENT DOCUMENTS

| 4,333,674 A | 6/1982 | Buettner et al. |
| 6,179,353 B1 | 1/2001 | Heatherington et al. |

(Continued)

FOREIGN PATENT DOCUMENTS

| KR | 100978216 | 8/2010 |

*Primary Examiner* — Joseph D Pape
*Assistant Examiner* — Dana Ivey
(74) *Attorney, Agent, or Firm* — Dinsmore & Shohl LLP

(57) ABSTRACT

Bumpers and vehicles that include bumpers are disclosed herein. In one embodiment, a bumper includes a bumper beam assembly, the bumper beam assembly including a beam, the beam including a front side that is oriented to face forward in a vehicle longitudinal direction, a bumper extension portion that is coupled to the beam and positioned at an outboard end of the bumper beam assembly, the bumper extension portion including a front side that is oriented face forward in the vehicle longitudinal direction, a top side that is oriented transverse to the front side, and a bottom side that is oriented transverse to the front side, and a reinforcement bracket that is coupled to the bumper extension portion, where the reinforcement bracket includes a front side that extends across the front side of the bumper extension portion.

20 Claims, 6 Drawing Sheets

(51) Int. Cl.
*B60R 19/02* (2006.01)
*B60R 19/18* (2006.01)
*B60R 19/03* (2006.01)

(52) U.S. Cl.
CPC .......... *B60R 19/34* (2013.01); *B60R 2019/247* (2013.01)

(58) Field of Classification Search
USPC .... 293/102, 133, 155, 149, 154; 280/87.051
See application file for complete search history.

(56) References Cited

U.S. PATENT DOCUMENTS

| | | |
|---|---|---|
| 7,080,862 B2 * | 7/2006 | Suzuki .................... B60R 19/24 293/154 |
| 7,147,258 B2 | 12/2006 | Evans et al. |
| 7,427,090 B2 | 9/2008 | Hodoya et al. |
| 8,029,033 B2 | 10/2011 | Hama et al. |
| 8,210,582 B2 * | 7/2012 | Parfut ....................... B60R 3/00 293/102 |
| 8,403,385 B2 | 3/2013 | Sugimoto et al. |
| 8,505,990 B2 * | 8/2013 | Czopek ................... B60R 19/18 293/102 |
| 2013/0249245 A1 | 9/2013 | Sekiguchi et al. |

* cited by examiner

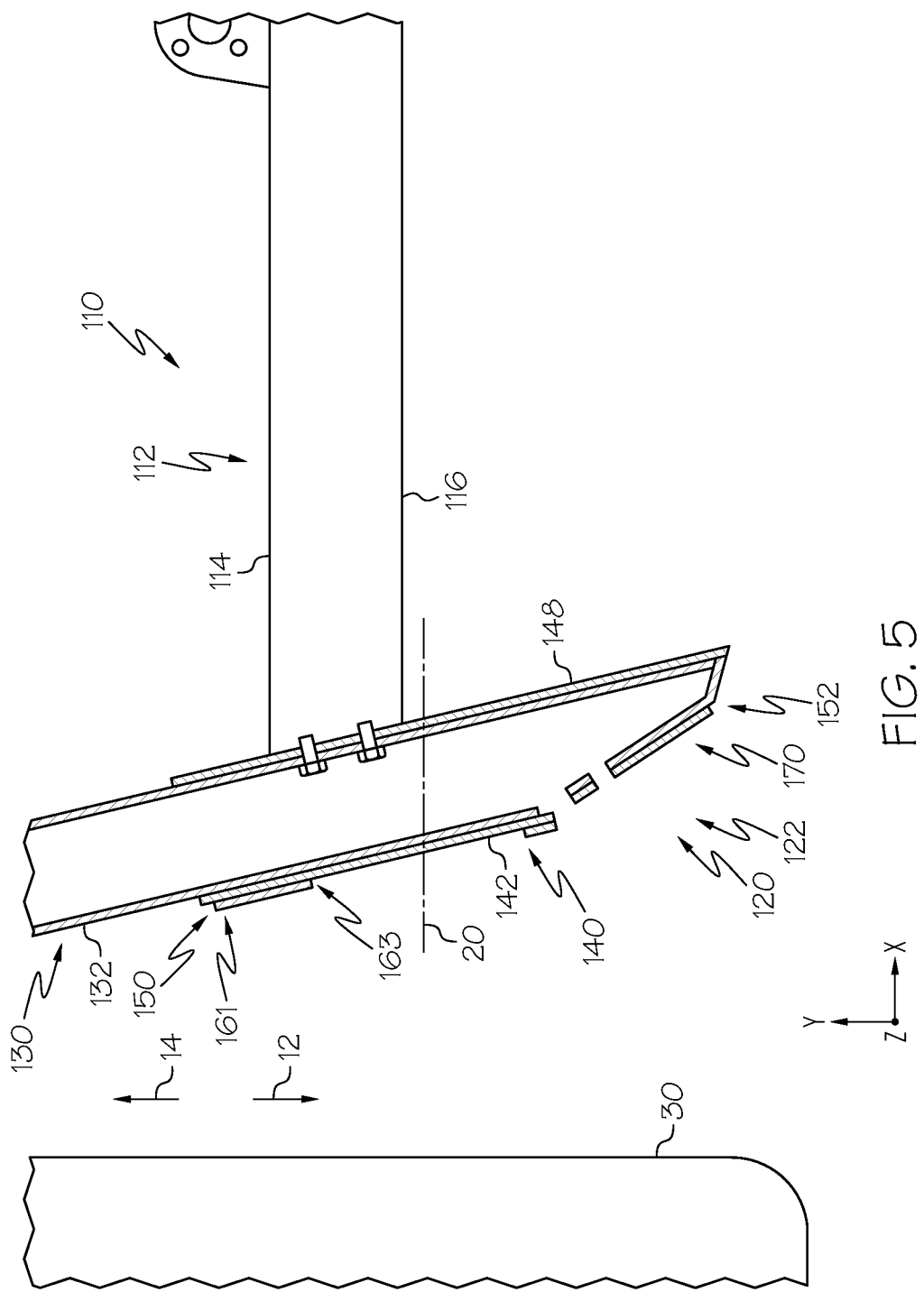

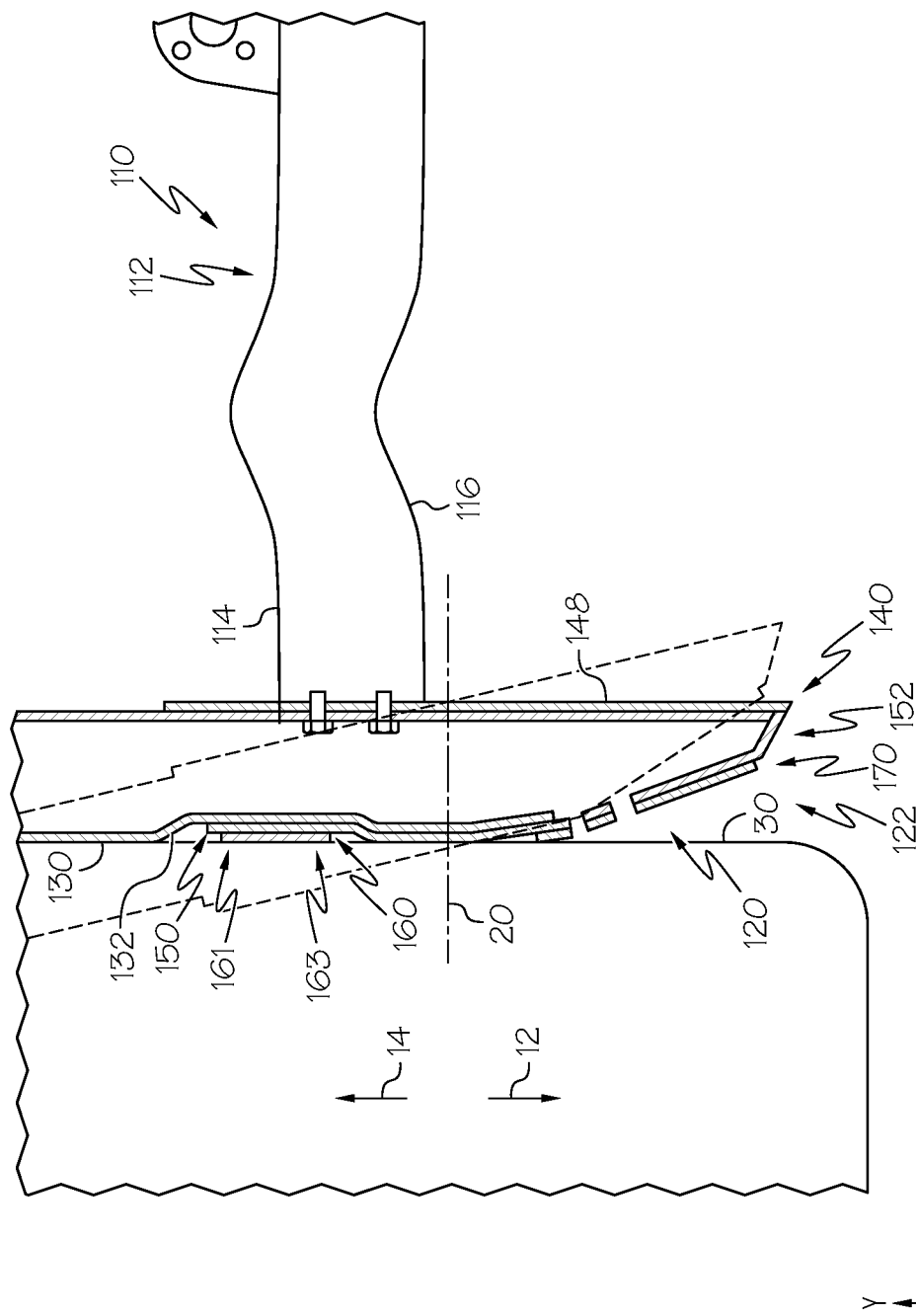

BUMPERS INCLUDING A REINFORCEMENT BRACKET AND VEHICLES INCORPORATING THE SAME

CROSS-REFERENCE TO RELATED APPLICATIONS

The present application claims the benefit of and priority to U.S. Provisional Patent Application No. 62/084,241, filed on Nov. 25, 2014 and titled "Bumpers Including a Reinforcement Bracket and Vehicles Incorporating the Same," the entire disclosure of which is hereby incorporated by reference.

TECHNICAL FIELD

The present specification generally relates to bumpers and vehicles that include bumpers, and more specifically, bumpers that include a reinforcement bracket.

BACKGROUND

Vehicles may be equipped with bumper systems and impact protection structures that elastically and plastically deform to absorb energy in the event of an impact.

In one example, during a small front bumper overlap impact, a substantial portion of energy from an impact may be directed outboard of many of the energy absorbing structures of the vehicle. In particular, a substantial portion of the energy from the impact is directed into the bumper assembly at a position that is outboard of many of the energy absorbing structures of the vehicle, and the energy from the impact may not be absorbed or may only be partially absorbed by those energy absorbing structures of the vehicle. Accordingly, vehicles may include various structures and reinforcements to absorb and direct energy associated with a small front bumper overlap impact. The structures and reinforcements may be positioned at outboard locations of the vehicle and may increase a stiffness of the vehicle and vehicle components evaluated in a vehicle longitudinal direction at outboard locations. While increasing the stiffness of the vehicle and vehicle components at outboard locations may absorb and direct energy associated with a small front bumper overlap impact, the structures and reinforcements may influence the vehicle to respond in a non-symmetrical manner during a flat frontal barrier impact.

Accordingly, a need exists for alternative structures for transferring energy and absorbing energy from an impact.

SUMMARY

In one embodiment, a bumper includes a bumper beam assembly, where the bumper beam assembly extends in a vehicle lateral direction, the bumper beam assembly including a beam that extends in the vehicle lateral direction, the beam including a front side that is oriented to face forward in a vehicle longitudinal direction that is transverse to the vehicle lateral direction, a top side that is oriented transverse to the front side, and a bottom side that is oriented transverse to the front side, a bumper extension portion that is coupled to the beam and positioned at an outboard end of the bumper beam assembly, the bumper extension portion including a front side that is oriented face forward in the vehicle longitudinal direction, a top side that is oriented transverse to the front side, and a bottom side that is oriented transverse to the front side, and a reinforcement bracket that is coupled to the bumper extension portion, where the reinforcement bracket includes a front side that extends across the front side of the bumper extension portion.

In another embodiment, a vehicle includes a side support that extends in a vehicle longitudinal direction, a bumper beam assembly that is coupled to the side support, where the bumper beam assembly extends in a vehicle lateral direction that is transverse to the vehicle longitudinal direction, the bumper beam assembly including a beam that extends in the vehicle lateral direction, the beam including a front side that is oriented to face forward in the vehicle longitudinal direction, a top side that is oriented transverse to the front side, and a bottom side that is oriented transverse to the front side, a bumper extension portion that is coupled to the beam and positioned at an outboard end of the bumper beam assembly, the bumper extension portion including a front side that is oriented to face forward in the vehicle longitudinal direction, a top side that is oriented transverse to the front side, and a bottom side that is oriented transverse to the front side, and a reinforcement bracket that is coupled to the bumper extension portion, where the reinforcement bracket includes a front side that extends across the front side of the bumper extension portion.

In yet another embodiment a vehicle includes a side support that extends in a vehicle longitudinal direction, a bumper beam assembly that is coupled to the side support, where the bumper beam assembly extends in a vehicle lateral direction that is transverse to the vehicle longitudinal direction, the bumper beam assembly including a reinforcement beam that extends in the vehicle lateral direction, a bumper extension portion that is coupled to the reinforcement beam and positioned at an outboard end of the bumper beam assembly, the bumper extension portion including an inboard end and an outboard end that is positioned outboard of the inboard end in the vehicle lateral direction, and a reinforcement bracket that is coupled to and positioned within the inboard end of the bumper extension portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 schematically depicts a top section view of the bumper beam assembly and the side support of FIG. 2 prior to a flat frontal barrier impact according to one or more embodiments shown or described herein; and FIG. 6 schematically depicts a top section view of the bumper beam assembly and the side support of FIG. 2 under deformation during a flat frontal barrier impact according to one or more of the embodiments shown or described herein.

DETAILED DESCRIPTION

Figure 1:
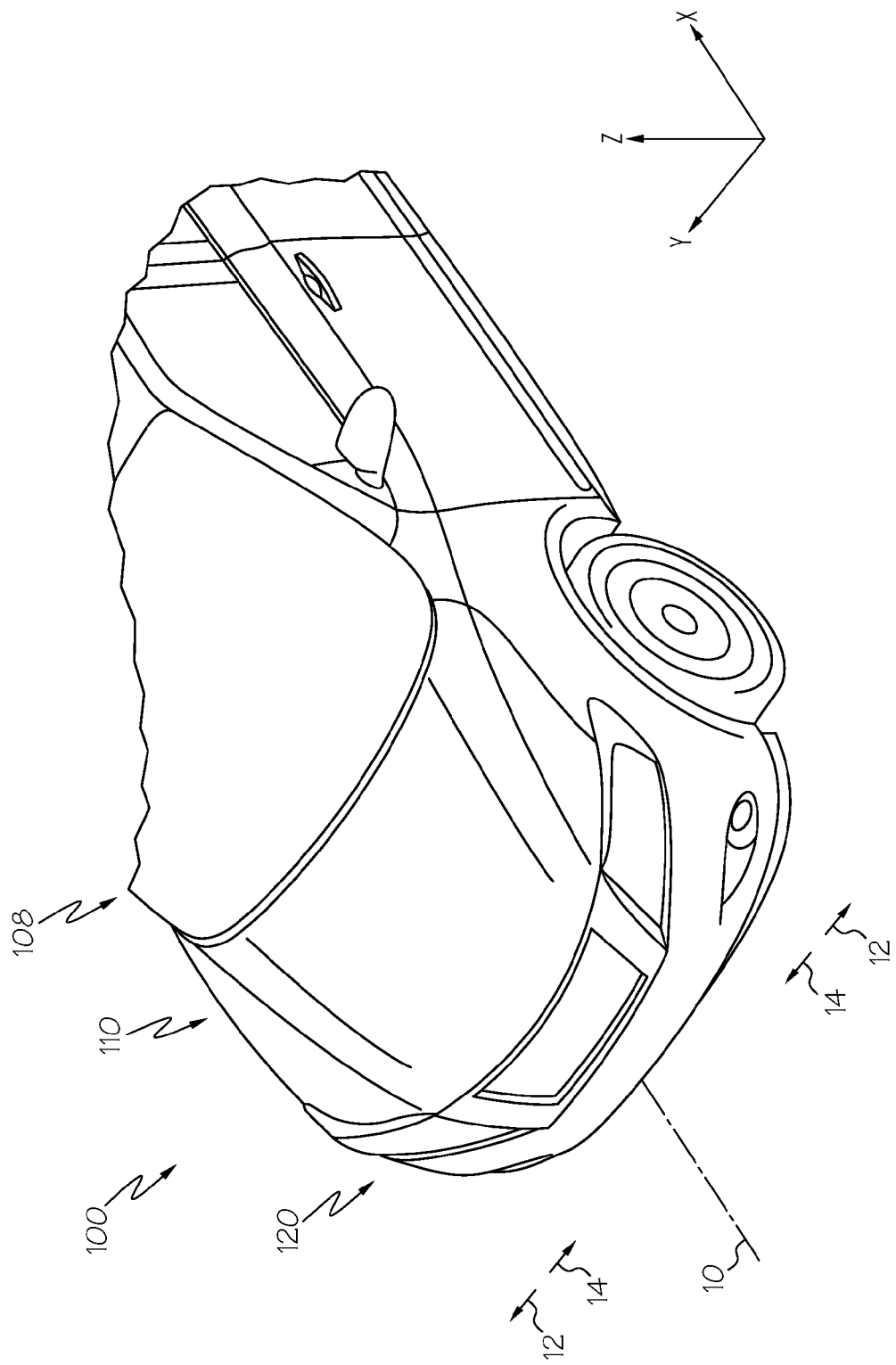
FIG. 1 schematically depicts a perspective view of a vehicle according to one or more embodiments shown or described herein.

Vehicles according to the present specification include bumpers that include a bumper beam assembly including a reinforcement beam and a bumper extension portion that extend in a vehicle lateral direction. The bumper extension portion includes a front side that is oriented to face forward in a vehicle longitudinal direction. The bumper beam assembly further includes a reinforcement bracket that is coupled to the bumper extension portion, where the reinforcement bracket includes a front side that extends across the front side of the bumper extension portion. In some embodiments, the bumper beam assembly is coupled to a side support of a vehicle. In some embodiments, the reinforcement bracket may be positioned within an inboard end of the bumper extension portion. The reinforcement bracket may increase a strength and/or stiffness of the bumper extension portion as compared to a bumper extension portion that does not include a reinforcement bracket. By increasing the strength and/or stiffness of the bumper extension portion, the reinforcement bracket may absorb and/or direct energy associated with an impact, such as a flat frontal barrier impact. These and other embodiments will be described in more detail below in reference to the appended drawings.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle. Referring to FIGS. 1-6, the term "outboard" as used herein refers to the relative location of a component in direction 12 with respect to a vehicle centerline 10. The term "inboard" as used herein refers to the relative location of a component in direction 14 with respect to a vehicle centerline 10. Because the vehicle structures and components may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIGS. 1-6 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 100 is depicted. The vehicle 100 includes a body 110 onto which a vehicle drivetrain is coupled. The vehicle 100 also includes a cabin 108 that is integral with the body 110. The cabin 108 generally defines a passenger cabin of the vehicle 100. The vehicle 100 includes a front bumper 120 that is positioned at the front of the vehicle 100.

Figure 2:
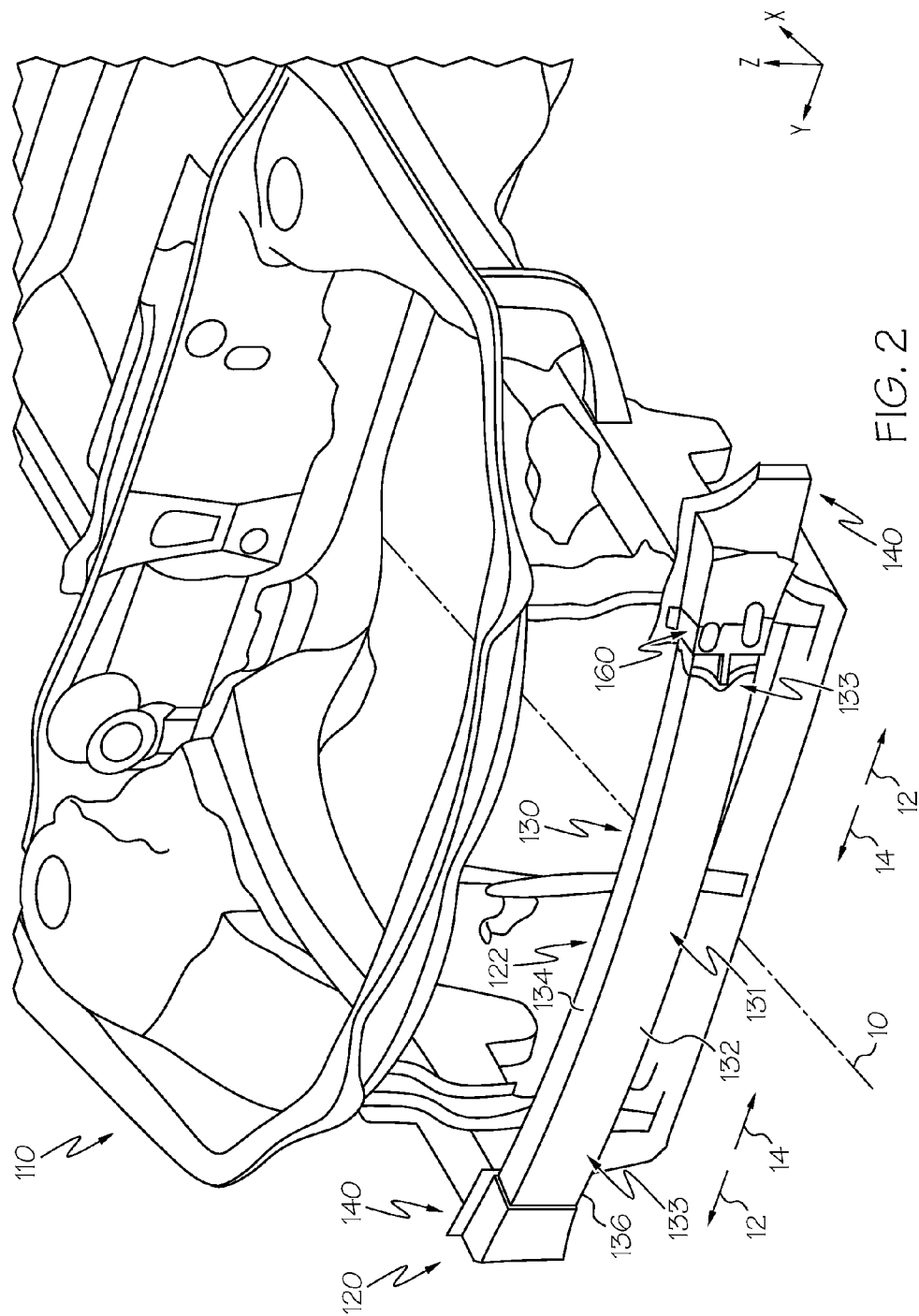
FIG. 2 schematically depicts a perspective view of a vehicle body including a bumper beam assembly and a reinforcement bracket according to one or more embodiments shown or described herein.

Referring to FIG. 2, the front bumper 120 and the body 110 are depicted with certain panels removed for clarity. The front bumper 120 includes a bumper beam assembly 122, which includes a reinforcement beam 130 and bumper extension portions 140. The reinforcement beam 130 and the bumper extension portions 140 extend in the vehicle lateral direction, terminating at opposite sides of the vehicle 100. The reinforcement beam 130 may have a generally curved shape, as depicted in FIG. 2. More specifically, the reinforcement beam 130 includes a front side 132 that is oriented to face forward in the vehicle longitudinal direction. An inboard position 131 on the front side 132 of the reinforcement beam 130 may be positioned forward of an outboard position 133 on the front side 132 of the reinforcement beam 130 in the vehicle longitudinal direction, thereby giving the reinforcement beam 130 a generally curved shape. In other embodiments, the reinforcement beam 130 may have a generally straight shape extending in the vehicle lateral direction. The reinforcement beam 130 may alternatively have any suitable shape that extends in the vehicle lateral direction.

The bumper extension portions 140 are positioned at outboard ends of the reinforcement beam 130. The bumper extension portion 140 may be formed as separate members that are coupled to the reinforcement beam 130 to form the bumper beam assembly 122. To couple the reinforcement beam 130 to the bumper extension portion 140, at least a portion of the reinforcement beam 130 may be positioned within the bumper extension portions 140. The bumper extension portions 140 may be coupled to the reinforcement beam 130 through a variety of joining techniques, including, but not limited to, a welded attachment, a brazed attachment, mechanical fasteners, and/or structural adhesives.

Figure 3:
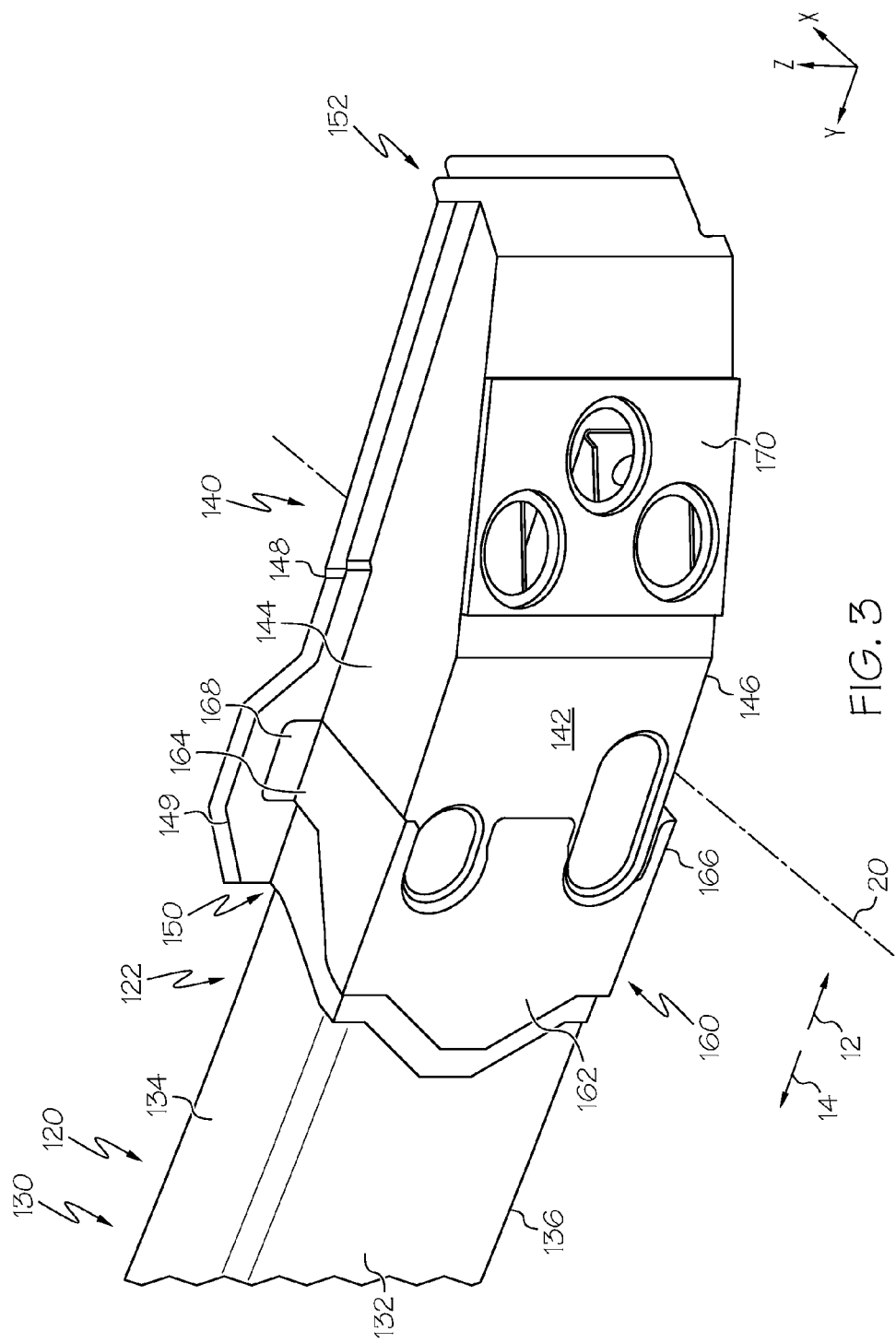
FIG. 3 schematically depicts an enlarged perspective view of the bumper beam assembly and the reinforcement bracket of FIG. 2 according to one or more embodiments shown or described herein.

Referring to FIG. 3, the bumper extension portion 140 includes a front side 142 that is oriented to face forward in the vehicle longitudinal direction. It should be noted that while only one bumper extension portion 140 is illustrated in FIG. 3, the opposite side of the reinforcement beam 130 may include the same or similar bumper extension portion 140. The front side 132 of the reinforcement beam 130 and the front side 142 the bumper extension portion 140 may be generally planar surfaces that extend in the vehicle lateral direction. In other embodiments, the front side 132 of the reinforcement beam 130 and the front side 142 of the bumper extension portion 140 may include contoured surfaces that extend in the vehicle lateral direction. Alternatively one of the front side 132 of the reinforcement beam 130 and the front side 142 of the bumper extension portion 140 may include a contoured surface and the other may include a planar surface. The front side 132 of the reinforcement beam 130 and the front side 142 of the bumper extension portion 140 may alternatively include any suitably shaped surface.

Figure 4:
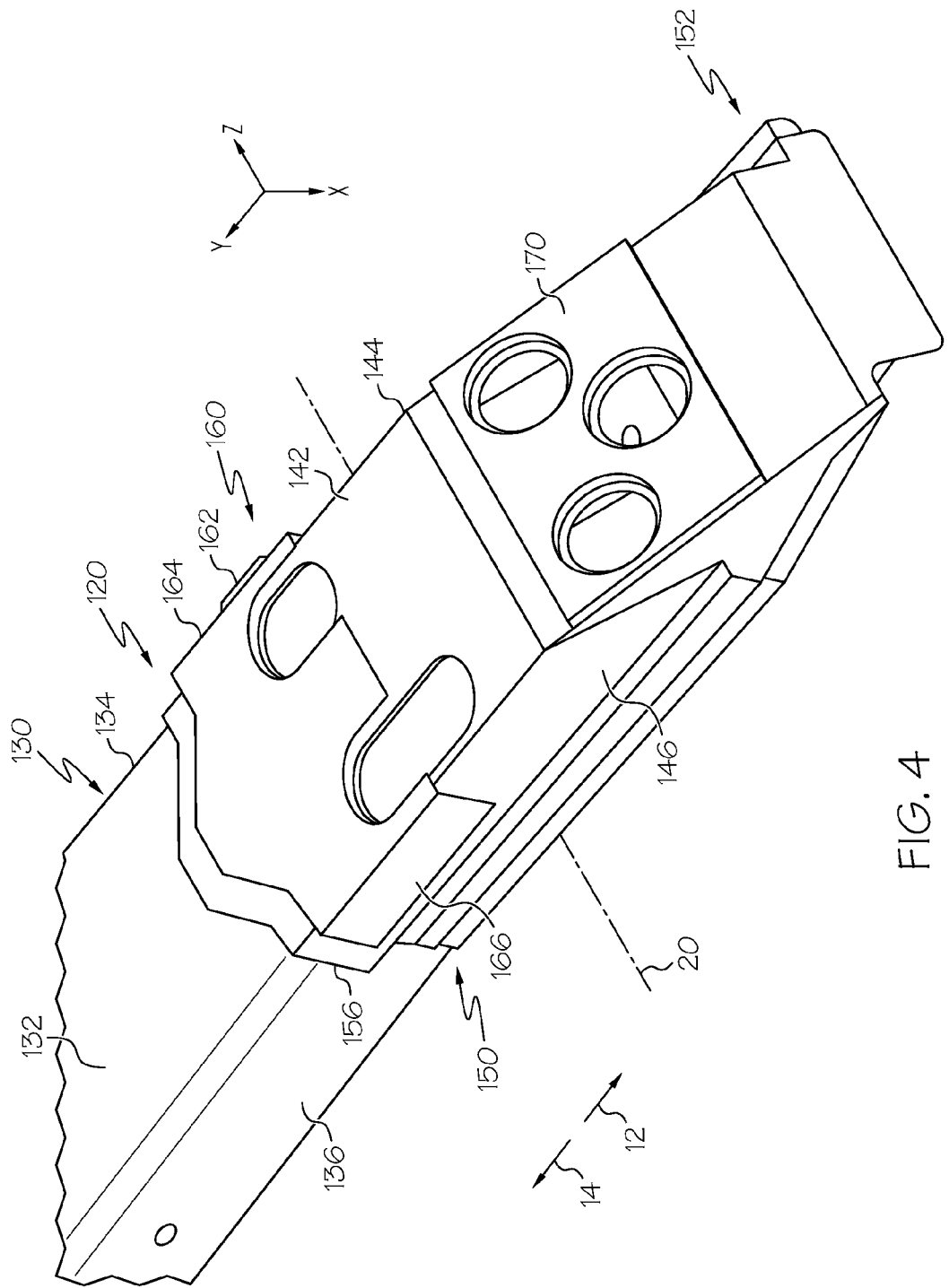
FIG. 4 schematically depicts an enlarged front view of the bumper beam assembly and the reinforcement bracket of FIG. 3 according to one or more embodiments shown or described herein.

Referring to FIG. 4, the reinforcement beam 130 includes a top side 134 and a bottom side 136 that is positioned opposite the top side 134. Likewise, the bumper extension portion 140 includes a top side 144 and a bottom side 146 that is positioned opposite the top side 144. The top sides 134, 144 and the bottom sides 136, 146 of the reinforcement beam 130 and the bumper extension portion 140 may be oriented transverse to the front sides 132, 142 of the reinforcement beam 130 and the bumper extension portion 140.

Referring again to FIG. 3, the bumper extension portion 140 includes a rear side 148 that is positioned rearward of the front side 142 in the vehicle longitudinal direction. The rear side 148 may include a flange 149 that extends upward from the top side 144 of the bumper extension portion 140 in the vehicle vertical direction.

The bumper extension portion 140 may include an inboard end 150 and an outboard end 152 that is positioned outboard of the inboard end 150. As used herein, the "inboard end 150" of the bumper extension portion 140 may be used to refer to positions on the bumper extension portion 140 that are inboard of a bumper extension centerline 20 that bisects the bumper extension portion 140 in the vehicle lateral direction. Conversely, the "outboard end 152" may be used to refer to positions on the bumper extension portion 140 that are outboard of the bumper extension centerline 20.

The bumper beam assembly 122 may include an outboard reinforcement 170 that is coupled to the outboard end 152 of the bumper extension portion 140. It should be noted that the outboard reinforcement 170 may be formed from a variety of materials including, for example and without limitation, metals, composites, and the like, and may be formed by any suitable method or combination of methods such as stamping, forging, machining, and the like. The outboard reinforcement 170 may be coupled to the bumper extension portion 140 through a variety of joining techniques, including, but not limited to, a welded attachment, a brazed attachment, mechanical fasteners, and/or structural adhesives. While the outboard reinforcement 170 is depicted as being positioned on the front side 146 of the bumper extension portion 140, the outboard reinforcement 170 may be positioned within the bumper extension portion 140, or may be positioned on the rear side 148 of the bumper extension portion 140. The outboard reinforcement 170 may be positioned on and coupled to any suitable side and/or surface of the outboard end 152 of the bumper extension portion 140. The outboard reinforcement 170 may increase a strength and/or stiffness of the outboard end 152 of the bumper extension portion 140 evaluated in the vehicle longitudinal direction. By increasing strength and/or stiffness of the outboard end 152 of the bumper extension portion 140, the outboard reinforcement 170 may absorb and/or direct energy associated with a small front bumper overlap impact, in which a substantial portion of the energy associated with the impact may be directed into the outboard end 152 of the bumper extension portion.

The bumper beam assembly 122 includes a reinforcement bracket 160 that is coupled to the bumper extension portion 140. It should be noted that the reinforcement bracket 160 may be formed from a variety of materials including, for example and without limitation, metals, composites, and the like, and may be formed by any suitable method or combination of methods such as stamping, forging, machining, and the like. The reinforcement bracket 160 may be formed of a material that is the same as or different than the material forming bumper extension portion 140. The reinforcement bracket 160 may be coupled to the bumper extension portion 140 through a variety of joining techniques, including, but not limited to, a welded attachment, a brazed attachment, mechanical fasteners, and/or structural adhesives.

The reinforcement bracket 160 may be coupled to the bumper extension portion 140 such that at least a portion of the reinforcement bracket 160 is coupled at the inboard end 150 of the bumper extension portion 140. It should be noted that the reinforcement bracket 160 may be coupled to the bumper extension portion 140 such that the reinforcement bracket 160 is positioned entirely within the inboard end 150 of the bumper extension portion 140. In some embodiments, the reinforcement bracket 160 may extend across the entirety of the inboard end 150 of the bumper extension portion 140 in the vehicle lateral direction. In other embodiments, the reinforcement bracket 160 may extend across only a portion of the bumper extension portion 140 in the vehicle lateral direction. By coupling the reinforcement bracket 160 to the inboard end 150 of the bumper extension portion 140, the reinforcement bracket 160 may provide a region having increased strength and/or stiffness of the bumper extension portion 140 at the inboard end 150 evaluated in the vehicle longitudinal direction. By providing a region having increased strength and/or stiffness at the inboard end 150 of the bumper extension portion 140, the reinforcement bracket 160 may assist in absorbing and/or distributing energy associated with an impact that is directed into the inboard end 150, such as energy associated with a flat frontal barrier impact.

Referring to FIG. 4, the reinforcement bracket 160 includes a front side 162 that extends across the front side 146 of the bumper extension portion 140. The front side 162 of the reinforcement bracket 160 may extend between the top side 144 and the bottom side 146 of the bumper extension portion 140 in the vehicle vertical direction. The front side 162 of the reinforcement bracket 160 may be coupled to the front side 146 of the bumper extension portion 140. By extending across and/or being coupled to the front side 142 of the bumper extension portion 140, the reinforcement bracket 160 may provide the region of increased strength and/or stiffness of the bumper extension portion 140 evaluated in the vehicle longitudinal direction. By increasing the strength and/or stiffness of the bumper extension portion 140 the reinforcement bracket 160 may absorb and distribute energy associated with an impact, such as a flat frontal barrier impact.

Referring to FIGS. 3 and 4 collectively, the reinforcement bracket 160 may include a top side 164 and/or a bottom side 166 that is positioned opposite the top side 164. The top side 164 of the reinforcement bracket 160 may extend across at least a portion of the top side 144 of the bumper extension portion 140 in the vehicle longitudinal direction. In some embodiments, the top side 164 of the reinforcement bracket may extend across the top side 144 of the bumper extension portion 140 between the front side 142 and the rear side 148 in the vehicle longitudinal direction. The bottom side 166 of the reinforcement bracket may extend across at least a portion bottom side 144 of the bumper extension portion 140 in the vehicle longitudinal direction. In some embodiments, the bottom side 166 of the reinforcement bracket 160 may extend across the bottom side 146 of the bumper extension portion 140 between the front side 142 and the rear side 148 in the vehicle longitudinal direction. The top side 164 and/or the bottom side 166 of the reinforcement bracket 160 may be coupled to the top side 144 and/or the bottom side 146 of the bumper extension portion 140.

The top side 164 and the bottom side 166 of the reinforcement bracket 160 can increase a section modulus of the reinforcement bracket 160 as compared to a reinforcement bracket 160 that does not include a top side 164 and/or a bottom side 166. The section modulus of a cross-sectional shape can be a direct measure of its strength and a higher section modulus can support greater loads. By increasing the section modulus of the reinforcement bracket 160, the top side 164 and/or the bottom side 166 of the reinforcement bracket 160 may increase the energy that may be absorbed by the bumper beam assembly 122 during an impact, such as flat frontal barrier impact.

The reinforcement bracket 160 may include a rear flange 168. The rear flange 168 may extend upward in the vehicle vertical direction from the top side 164 of the reinforcement bracket 160. The rear flange 168 of the reinforcement bracket 160 may contact the flange 139 of the bumper extension portion 140. In embodiments, the rear flange 168 of the reinforcement bracket 160 may be coupled to the flange 149 of the bumper extension portion 140. The reinforcement bracket 160 may include a rear flange 168 that contacts and/or is coupled to the flange 149 of the bumper extension portion 140. The rear flange 168 and the flange 149 may cooperate to absorb energy associated with an impact into the flanges 149 and 168. In particular, contact between the rear flange 168 and the flange 149 may provide a load path to direct energy associated with an impact from the reinforcement bracket 160 to the bumper extension portion 140. Additionally, the contact between the rear flange 168 and the flange 149 may restrict translation of the reinforcement bracket 160 in the vehicle longitudinal direction during an impact, thereby influencing the reinforcement bracket 160 to plastically and elastically deform, absorbing energy associated with the impact.

Referring to FIG. 5, the front bumper 120 of a vehicle 100 is depicted prior to a flat frontal barrier impact with a barrier 30. As depicted in FIG. 5, the reinforcement bracket 160 is coupled to the bumper extension portion 140 and the reinforcement beam 130 is positioned at least partially within the bumper extension portion 140. The reinforcement beam 130 may extend in the vehicle lateral direction within the bumper extension portion 140 such that at least a portion of the reinforcement bracket 160 overlaps the reinforcement beam 130 in the vehicle lateral direction. The bumper beam assembly 122 may have a region of increased strength and/or stiffness proximate to the reinforcement bracket 160 as compared to bumper beam assemblies 122 that do not include a reinforcement bracket 160 that is positioned such that at least a portion of the reinforcement bracket 160 overlaps the reinforcement beam 130 in the vehicle lateral direction.

The body 110 of the vehicle 100 includes a side support 112 that extends in the vehicle longitudinal direction. At least a portion of the reinforcement bracket 160 may be positioned inboard of the side support 112 in the vehicle lateral direction. In particular, the reinforcement bracket 160 includes and may terminate at an inboard end 161 and an outboard end 163, where the inboard end 161 is positioned inboard of the outboard end 163 in the vehicle lateral direction. In embodiments, such as the embodiment depicted in FIG. 5, the inboard end 161 of the reinforcement bracket 160 may be positioned inboard of an inboard surface 114 of the side support 112 and the outboard end 163 of the reinforcement bracket 160 may be positioned outboard of the inboard surface 114 of the side support 112. In other embodiments, the outboard end 163 of the reinforcement bracket 160 may be positioned inboard of the inboard surface 114 of the side support 112. The reinforcement bracket 160 may be positioned inboard of the side support 112 in the vehicle lateral direction to increase a strength and/or stiffness of the bumper extension portion 140 at positions inboard of the side support 112 (i.e., within a central region of the reinforcement beam 130). By increasing the strength and/or stiffness of the bumper extension portion 140 at positions inboard of the side support 112, the reinforcement bracket 160 may absorb and distribute energy from an impact directed to positions inboard of the side support 112, such as energy associated with a flat frontal barrier impact.

Alternatively, the inboard end 161 of the reinforcement bracket may be positioned outboard of the inboard surface 114 of the side support 112 to increase the strength and/or stiffness of the bumper extension portion 140 at positions outboard of the inboard surface 114 of the side support 112. By increasing the strength and/or stiffness of the bumper extension portion 140 at positions outboard of the inboard surface 114 of the side support, the reinforcement bracket 160 may absorb and distribute energy from an impact directed to positions outboard of the inboard surface 114 of the side support 112, such as energy associated with a flat frontal barrier impact.

When a barrier impacts a vehicle, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

A barrier may impact a front corner of the vehicle in what is referred to herein as a small front bumper overlap or a small overlap impact. In a small front bumper overlap impact, the impact occurs at an outboard portion of the vehicle (evaluated in the vehicle lateral direction), and the barrier only impacts a portion of the front bumper. In some small front bumper overlap impacts, the barrier only impacts about 25% of the front bumper evaluated in the vehicle lateral direction.

In other impact configurations, a barrier may impact the front of the vehicle in what is referred to herein as a flat frontal barrier impact. In a flat frontal barrier impact, the barrier impacts a substantial portion of the front bumper (evaluated in the vehicle lateral direction). In some flat frontal barrier impacts, the barrier may impact greater than 25% of the front bumper evaluated in the vehicle lateral direction.

Still referring to FIG. 5 and as described hereinabove, the bumper extension portion 140 may include the outboard reinforcement 170 that is positioned at the outboard end 152 of the bumper extension portion 140 and that increases the strength and/or stiffness of outboard end 152 of the bumper extension portion 140. In some embodiments, such as the embodiment depicted in FIG. 5, the outboard reinforcement 170 may be positioned outboard of an outboard surface 116 of the side support 112. By increasing the strength and/or stiffness of the outboard end 152 of the bumper extension portion 140, the outboard reinforcement 170 may absorb and/or direct energy during a small front bumper overlap impact. However, by increasing the strength and/or stiffness of the outboard end 152 of the bumper extension portion 140, the outboard reinforcement 170 may cause the bumper extension portion 140 to react in a non-symmetrical manner during a flat frontal barrier impact. In particular, the outboard end 152 of the bumper extension portion 140 may have a relatively high strength and/or stiffness as compared to the inboard end 150 of the bumper extension portion 140, which can cause the outboard end 152 of the bumper extension portion 140 to plastically and elastically deform less than the inboard end 150 during a flat frontal barrier impact. As the outboard end 152 of the bumper extension portion 140 may plastically and elastically deform less than the inboard end 150, the outboard end 152 and the inboard end 150 of the bumper extension portion 140 may not uniformly translate rearward in the vehicle longitudinal direction, which can cause the bumper beam assembly 122 to rotate in a counter clockwise direction about the side support 112.

Rotation of the bumper beam assembly 122 in a counterclockwise direction about the side support 112 during a flat frontal barrier impact can cause the side support 112 to deflect inboard and away from the direction of the impact. When the side support 112 deflects inboard and/or outboard and away from the direction of the impact, the side support 112 may absorb less energy associated with the flat frontal barrier impact as compared to when the side support is maintained proximate to its original longitudinal orientation. In particular, when the side support 112 deflects inboard and/or outboard and away from the direction of the impact, the side support may not plastically and elastically deform or may deform less than when the side support 112 is maintained proximate to its original longitudinal orientation, thereby absorbing less energy associated with the impact.

Referring now to FIG. 6, the front bumper 120 of a vehicle 100 is depicted during a flat frontal barrier impact. As described hereinabove, during a flat frontal barrier impact, the barrier 30 may impact a substantial portion of the front bumper 120 evaluated in the vehicle lateral direction. When the barrier 30 impacts the front bumper 120, the bumper beam assembly 122 plastically and elastically deforms and translates rearward in the vehicle longitudinal direction.

As described hereinabove, the reinforcement bracket 160 may be positioned at the inboard end 150 of the bumper extension portion 140 and/or may be positioned inboard of the side support 112. By positioning the reinforcement bracket 160 at the inboard end 150 of the bumper extension portion 140 and/or inboard of the side support 112, the reinforcement bracket 160 increases the strength and/or stiffness of the bumper extension portion 140 at the inboard end 150 and/or at positions inboard of the side support 112. As also described hereinabove, the bumper extension portion 140 may include an outboard reinforcement 170 that increases the strength and/or stiffness of the outboard end 152 of the bumper extension portion 140. Because the reinforcement bracket 160 increases the strength and/or stiffness of the inboard end 150 of the bumper extension portion 140, during a flat frontal barrier impact, the inboard end 150 and the outboard end 152 of the bumper extension portion 140 at opposite sides of the side support 112 may plastically and elastically deform in a more similar manner. In particular, the inboard end 150 and the outboard end 152 may plastically and elastically deform in a similar manner such that the inboard end 150 and the outboard end 152 may translate generally rearward in the vehicle longitudinal direction in a similar manner.

As the inboard end 150 and the outboard end 152 translate rearward in the vehicle longitudinal direction, energy associated with the impact is transferred from the bumper beam assembly 122 into the side support 112. The inboard end 150 and the outboard end 152 of the bumper extension portion 140 may translate generally rearward in the vehicle longitudinal direction in a similar manner, which may cause the energy associated with the impact to be directed generally rearward in the vehicle longitudinal direction into the side support 112. As the energy associated with the impact is directed generally rearward in the vehicle longitudinal direction, the side support 112 may be maintained proximate to its original longitudinal orientation, without or with minimal deflection inboard and/or outboard and away from the direction of the impact. Accordingly, the reinforcement bracket 160 may resist inboard and/or outboard deflection of the side support 112 during a flat frontal barrier impact. When the side support 112 is maintained near a longitudinal orientation, the side support 112 may absorb more energy associated with the flat frontal barrier impact as compared to when the side support 112 deflects inboard and/or outboard in the vehicle lateral direction. Such an arrangement may result in less energy associated with the impact being directed into the cabin 108 of the vehicle 100. Accordingly, by positioning the reinforcement bracket 160 at the inboard end 150 of the bumper extension portion 140 and/or inboard of the side support 112, the reinforcement bracket 160 may reduce the amount of energy that may be directed into the cabin 108 of the vehicle 100 during a flat frontal barrier impact.

The reinforcement bracket 160 includes the front side 162 that extends across the front side 142 of the bumper extension portion 140, which can increase the strength and/or stiffness of the bumper extension portion 140. By increasing the strength and/or stiffness of the bumper extension portion 140, the reinforcement bracket 160 may absorb and/or direct energy associated with an impact, such as a flat frontal barrier impact. By absorbing and/or direction energy associated with the flat frontal barrier impact, the reinforcement bracket 160 may reduce the amount of energy associated with the impact that is directed into the cabin 108 of the vehicle 100.

Further, as described hereinabove and referring to FIGS. 3 and 4, the reinforcement bracket 160 may include the top side 164 and/or the bottom side 166 that extend across and may be coupled to the top side 144 and the bottom side 146 of the bumper extension portion 140. The top side 164 and/or the bottom side 166 of the reinforcement bracket 160 may increase the section modulus of the reinforcement bracket 160 as compared to a reinforcement bracket 160 that does not include a top side 164 and a bottom side 166. By increasing the section modulus of the reinforcement bracket 160 and thus bumper extension portion 140, the top side 164 and the bottom side 166 of the reinforcement bracket 160 may increase the amount of energy that may be absorbed by the bumper extension portion 140 during an impact, such as a flat frontal barrier impact. By increasing the amount of energy that may be absorbed by the bumper extension portion 140, the top side 164 and the bottom side 166 may reduce the amount of energy associated with the impact that may be directed into the cabin 108 of the vehicle 100.

The reinforcement beam 130 may be positioned within the bumper extension portion 140 such that at least a portion of the reinforcement beam 130 overlaps with the reinforcement bracket 160 in the vehicle lateral direction, which may increase the strength and/or stiffness of the bumper beam assembly 122 proximate to the reinforcement bracket 160. By increasing the strength and/or stiffness of the bumper beam assembly 122 proximate to the reinforcement bracket 160, the reinforcement bracket may increase the amount of energy that may be absorbed by the bumper beam assembly 122 during an impact, such as a flat frontal barrier impact. By increasing the amount of energy that may be absorbed by the bumper beam assembly 122, the reinforcement bracket 160 may reduce the amount of energy associated with the impact that may be directed into the cabin 108 of the vehicle 100.

It should now be understood that bumpers according to the present disclosure may include a bumper beam assembly including a beam and a bumper extension portion that extend in the vehicle lateral direction. The bumper extension portion includes a front side that is oriented to face forward in the vehicle longitudinal direction. The bumper beam assembly further includes a reinforcement bracket that is coupled to the bumper extension portion, where the reinforcement bracket includes a front side that extends across the front side of the bumper extension portion. In some embodiments, the bumper beam assembly is coupled to a side support of a vehicle. In some embodiments, the reinforcement bracket may be positioned within an inboard end of the bumper extension portion. The reinforcement bracket may increase a strength and/or stiffness of the bumper extension portion as compared to a bumper extension portion that does not include a reinforcement bracket. By increasing the strength and/or stiffness of the bumper extension portion, the reinforcement bracket may absorb and/or direct energy associated with an impact, such as a flat frontal barrier impact. Further, by positioning the reinforcement bracket within the inboard end of the bumper extension portion, the reinforcement bracket may resist inboard and/or outboard deflection of the side support 112 during a flat frontal barrier impact.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper comprising:
   a bumper beam assembly, wherein the bumper beam assembly extends in a vehicle lateral direction, the bumper beam assembly comprising:
   a reinforcement beam that extends in the vehicle lateral direction, the reinforcement beam comprising:
      a front side that is oriented to face forward in a vehicle longitudinal direction that is transverse to the vehicle lateral direction;
      a top side that is oriented transverse to the front side; and
      a bottom side that is oriented transverse to the front side;
   a bumper extension portion that is coupled to the reinforcement beam and positioned at an outboard end of the bumper beam assembly, the bumper extension portion comprising:
      a front side that is oriented face forward in the vehicle longitudinal direction;
      a top side that is oriented transverse to the front side; and
      a bottom side that is oriented transverse to the front side; and
   a reinforcement bracket that is coupled to the bumper extension portion, wherein the reinforcement bracket comprises a front side that extends across the front side of the bumper extension portion.

2. The bumper of claim 1, wherein the reinforcement bracket is coupled to an inboard end of the bumper extension portion.

3. The bumper of claim 1, wherein at least a portion of the reinforcement beam is positioned within the bumper extension portion.

4. The bumper of claim 3, wherein at least a portion of the reinforcement bracket overlaps the reinforcement beam in the vehicle lateral direction.

5. The bumper of claim 1, wherein the bumper extension portion further comprises an outboard reinforcement that is positioned at an outboard end of the bumper extension portion.

6. The bumper of claim 1, wherein the reinforcement bracket comprises a top side that extends across the top side of the bumper extension portion in the vehicle longitudinal direction.

7. The bumper of claim 6, wherein the reinforcement bracket comprises a rear flange that extends upward from the top side of the reinforcement bracket and the rear flange is coupled to a flange of the bumper extension portion.

8. The bumper of claim 1, wherein the reinforcement bracket comprises a bottom side that extends across the bottom side of the bumper extension portion.

9. A vehicle comprising:
   a side support that extends in a vehicle longitudinal direction;
   a bumper beam assembly that is coupled to the side support, wherein the bumper beam assembly extends in a vehicle lateral direction that is transverse to the vehicle longitudinal direction, the bumper beam assembly comprising:
   a reinforcement beam that extends in the vehicle lateral direction, the reinforcement beam comprising:
      a front side that is oriented to face forward in the vehicle longitudinal direction;
      a top side that is oriented transverse to the front side; and
      a bottom side that is oriented transverse to the front side;
   a bumper extension portion that is coupled to the reinforcement beam and positioned at an outboard end of the bumper beam assembly, the bumper extension portion comprising:
      a front side that is oriented to face forward in the vehicle longitudinal direction;
      a top side that is oriented transverse to the front side; and
      a bottom side that is oriented transverse to the front side; and
   a reinforcement bracket that is coupled to the bumper extension portion, wherein the reinforcement bracket comprises a front side that extends across the front side of the bumper extension portion.

10. The vehicle of claim 9, wherein the reinforcement bracket is coupled to an inboard end of the bumper extension portion.

11. The vehicle of claim 9, wherein at least a portion of the reinforcement beam is positioned within an inboard end of the bumper extension portion.

12. The vehicle of claim 11, wherein at least a portion of the reinforcement bracket overlaps the reinforcement beam in the vehicle lateral direction.

13. The vehicle of claim 9, wherein the bumper extension portion further comprises an outboard reinforcement that is positioned at an outboard end of the bumper extension portion.

14. The vehicle of claim 13, wherein the outboard reinforcement is positioned outboard of the side support in the vehicle lateral direction.

15. The vehicle of claim 9, wherein at least a portion of the reinforcement bracket extends inboard of the side support in the vehicle lateral direction.

16. The vehicle of claim 9, wherein the reinforcement bracket comprises a bottom side that extends across the bottom side of the bumper extension portion.

17. A vehicle comprising:
 a side support that extends in a vehicle longitudinal direction;
 a bumper beam assembly that is coupled to the side support, wherein the bumper beam assembly extends in a vehicle lateral direction that is transverse to the vehicle longitudinal direction, the bumper beam assembly comprising:
 a reinforcement beam that extends in the vehicle lateral direction;
 a bumper extension portion that is coupled to the reinforcement beam and positioned at an outboard end of the bumper beam assembly, the bumper extension portion comprising an inboard end and an outboard end that is positioned outboard of the inboard end in the vehicle lateral direction; and
 a reinforcement bracket that is coupled to and positioned within the inboard end of the bumper extension portion.

18. The vehicle of claim 17, further comprising an outboard reinforcement coupled to the outboard end of the bumper extension portion.

19. The vehicle of claim 18, wherein at least a portion of the reinforcement bracket is positioned inboard of the side support in the vehicle lateral direction such that when the vehicle impacts a barrier in a flat frontal barrier impact, the reinforcement bracket resists deflection of the side support in the vehicle lateral direction.

20. The vehicle of claim 17, wherein the bumper extension portion further comprises a front side and the reinforcement bracket comprises a front side that extends across the front side of the bumper extension portion.

\* \* \* \* \*